United States Patent Office 2,871,215
Patented Jan. 27, 1959

2,871,215

STABLE CHLOROPHTHALIC ACID MODIFIED UNSATURATED ALKYD RESIN MOLDING COMPOSITIONS

James W. Hyland, Jr., Maumee, Ohio, assignor to Allied Chemical Corporation, a corporation of New York No Drawing. Application January 12, 1955
Serial No. 481,491

11 Claims. (Cl. 260—40)

This invention relates to stable solid alkyd resin molding compositions that give molded articles having improved electrical properties and water resistance.

Industrially, there is a clear distinction between molding compositions on the one hand, and casting compositions on the other hand. Molding compositions, as the term molding implies, are solids introduced as such into molds where they are subjected to pressures of from 200 to 3,000 pounds per square inch and temperatures of from 250° to 350° F. to produce the desired articles. Casting compositions, on the other hand, are liquids poured as such into molds where they are subjected to temperatures of from 180° to 250° F. and usually no pressure. The present invention is concerned with molding compositions adapted and intended to be molded under pressures of 200 to 3,000 pounds per square inch at the elevated temperatures indicated and as distinguished from liquid alkyd resin casting compositions.

A rapidly growing demand exists for polymerizable unsaturated alkyd molding compositions. For many purposes, it is necessary that such molding compositions be in granular form, permitting the ready and convenient storage, handling of the material and feed thereof in measured amounts to the molds. Such molding compositions in non-tacky granular form are particularly desirable in that they have the advantages of not caking or setting up in storage and are readily and conveniently handled in use, particularly from the standpoint of measuring the desired amount for introduction into the molds. There is a substantial demand for such molding compositions in the form of sheets or relatively thin strips which can be fed as such to the molds or cut into desired size for feeding to the molds to produce the desired molded articles having improved electrical properties and water resistance. These molding compositions are widely used in the electronic field, such for example as radio frequency tuners, and in high frequency, high voltage television type circuits where high insulation resistance properties are important. By insulation resistance is meant the resistance offered to the flow of a current when a voltage is impressed between two electrodes embedded in a hardened composition at a standard distance (i. e., 1¼ inches between the center of the electrodes in the standard test used to measure the insulation resistance). Articles produced from alkyd molding compositions available prior to my invention are particularly subject to deterioration in insulation resistance when exposed to high relative humidities and high temperatures.

Polymerizable alkyd casting compositions made by condensing a glycol with a dicarboxylic acid, such as maleic or fumaric, and adding to the resultant polyester a liquid monomeric unsaturated copolymerizable material, such as styrene, vinyl acetate or diallyl phthalate and a filler, such as calcium carbonate, have been suggested. Such casting alkyd compositions, as the term casting implies, are liquid and frequently are relatively unstable. If it is attempted to store such alkyd casting compositions containing a polymerization catalyst, it is not unusual for polymerization to proceed to the point where the casting material can no longer be used. The instability of such casting alkyd mixtures during storage at room temperatures (about 20° C.), in part at least, is due to the fact that air does not have the opportunity for access to a material proportion of the alkyd resin mixture containing the polymerization catalyst, due to the fact that the resin mixture is in the liquid phase. Hence, of necessity, the air can only have access to the surface of the liquid and not to the portion of the resin mixture below the surface. It is well known that air at room temperature has a stabilizing influence on polymerizable alkyd resins.

It is among the objects of the present invention to provide alkyd molding compositions which result in molded articles of improved water absorption and electrical properties, particularly insulation resistance, which molding compositions contain all of the constituents including polymerization catalyst required to produce the desired molded articles so that they can readily, conveniently and economically be handled by the fabricator, and which molding compositions are stable in storage for relatively long periods of time, of the order of several months or longer. Other objects and advantages of this invention will be apparent from the following detailed description thereof.

The present invention provides molding compositions, preferably in non-tacky granular form, containing all the constituents required to produce the desired molded articles, including the catalyst, pigment if used, mold lubricant and other additives. Since the molding compositions are in the form of solid granular particles or relatively thin sheets presenting large surface area to the atmosphere, they provide optimum conditions for stability, particularly from the standpoint of permitting access of air thereto. Furthermore, since the molding compositions do not require the incorporation of a catalyst or of other constituents by the user, they can be used readily, conveniently and more economically than materials requiring the addition of catalyst or other additives before they can be introduced into the mold, if for no other reason, because of the saving of labor.

The present invention is based upon the discovery that stable molding compositions which give superior products, particularly from the standpoint of their insulation resistance and water resistance, result by combining:

(1) An amorphous polymerizable unsaturated alkyd solid at room temperature (about 20° C.) and produced by condensing a polyhydric alcohol with a mixture of polycarboxylic acids in equimolar amounts or using a small excess of the polyhydric alcohol, not exceeding about 10%, based on the stoichiometric amount of alcohol required, in which alkyd from 4 mol percent to 40 mol percent of the polycarboxylic acid radicals are derived from a chloro-substituted phthalic acid and from 60 mol percent to 96 mol percent of such radicals are derived from a dicarboxy alkene having from 4 to 5 carbon atoms, in which the carboxy radicals are attached to adjacent carbon atoms, the reaction between the polyhydric alcohol and the polycarboxylic acids being carried out to produce a polymerizable unsaturated alkyd having a viscosity of from 0.90 to 5.0, preferably from 0.95 to 3.15 poises, and an acid number of from 10 to 35, preferably from 15 to 27;

(2) Diallyl phthalate, preferably in proportions of more than one part of diallyl phthalate per 9 parts of the amorphous polymerizable unsaturated alkyd, the maximum amount of the liallyl phthalate not exceeding $$10+n+\frac{X}{\sqrt{n}}\%$$

of the total weight of the amorphous alkyd and the diallyl phthalate, in which formula $n$ is the average number of chlorine atoms per chloro-substituted phthalic acid radical in the unsaturated alkyd, and X is the chlorine content of such radicals expressed as percent by weight of the unsaturated alkyd;

(3) A filler in amount of from 50% to 85% based on the total weight of the mixture;

(4) An organic peroxide catalyst and other additives, if used, including pigments, stabilizers and mold lubricants; and (5) Mixing the above constituents under conditions such that substantially no reaction takes place between the diallyl phthalate and the alkyd, i. e., no cross-linkage formation occurs, substantially no polymerization of the unsaturated alkyd takes place during the mixing, and the amorphous alkyd is in a plastic state or in solution during the mixing, to effect the uniform distribution of the filler and other constituents throughout the alkyd and produce a substantially homogeneous molding composition.

The viscosity values given above and in the claims are determined by using a solution of 50% by weight of resin and 50% methyl Cellosolve, and comparing at 25° C. a sample of such resin solution with Gardner Holdt tubes containing a standard viscosity liquid, which tubes, as conventional, are lettered from A to Z in increasing order of viscosity. From these values, the values in poises are determined from a chart showing the equivalent values in poises for the letter values of Garnder Holdt.

The acid number is determined by titrating against alcoholic KOH a true, clear solution of the resin in acetone, which solution is at room temperature (about 20° C.). The acid number is a measure of the unreacted carboxyl groups present. It decreases as the esterification proceeds.

The viscosity is a measure of the length of the chain which is built up during the esterification reaction. The viscosity increases as the esterification proceeds. Theoretically, for the same reactants, the acid number value is inversely proportional to the viscosity value in indicating the extent of esterification. Actually however this is not the case, because the viscosity is also affected by polymerization which may occur between the double bonds of the acid groups, i. e., addition polymerization or vinyl polymerization. It is important that no addition polymerization take place in the esterification step. For these reasons both the viscosity value and acid numbers are important in defining the extent of esterification.

As above indicated, in accordance with this invention the esterification is continued until the alkyd resin has a viscosity within the range of from 0.9 to 5.0, preferably from 0.95 to 3.15 poises, and an acid number of from 10 to 35, preferably from 15 to 27. These values are critical. If the esterification is not carried to the minimum value for the viscosity and the maximum value for the acid number, the alkyd resin will not result in a molding composition having the desired strength characteristics. If the esterification is carried beyond the maximum value for the viscosity and the minimum value for the acid number, the resin will be too viscous to allow satisfactory incorporation of the fillers and will not result in a molding composition which gives molded articles having the desired properties. The use of an alkyd resin having the chemical composition, viscosity and acid number noted above in combination with the other conditions above enumerated is believed to be responsible for the improvement in water resistance and electrical properties of the molded articles made from the molding compositions of this invention.

POLYMERIZABLE UNSATURATED ALKYD

The term "amorphous" is used herein to distinguish the alkyd from a crystalline polymerizable unsaturated alkyd which results when ethylene glycol is reacted with maleic or fumaric acids or maleic anhydride. Heretofore in the production of non-tacky granular molding compositions having a high content of liquid unsaturated monomer, crystalline unsaturated alkyds were used to obtain non-tacky products. Crystalline unsaturated alkyds, however, do not result in molding compositions having the desired properties and strength characteristics. The use of amorphous alkyds, on the other hand, does not have these disadvantages and results in the production of molding compositions having improved electrical and water absorption properties. The alkyds employed in accordance with this invention are brittle solids at room temperature. When heated to temperatures in the range of from about 130° to 250° F., they become sufficiently plastic so that the filler and other constituents can be uniformly distributed throughout without further undesirable polymerization of the unsaturated alkyd taking place. Temperatures above 180° F. must be avoided, however, once the peroxide catalyst is added to the alkyd resin for reasons set forth hereinafter in a description of the preparation of the molding composition.

In the molecular structure of the amorphous polymerizable unsaturated alkyd, from 4% to 40% of polycarboxylic acid radicals are derived from a chloro-substituted phthalic acid, and from 60% to 96% of such radicals are derived from a dicarboxy alkene having from 4 to 5 carbon atoms and in which the carboxy radicals are attached to adjacent carbon atoms.

The term "chloro-substitued phthalic acid" is used herein to include mono-, di-, tri- and tetrachloro-substituted o-phthalic acids, isophthalic acids, and terephthalic acids. Examples of chloro-substituted phthalic acids include: 4-chlorophthalic acid, 3-chlorophthalic acid, 3,6-dichlorophthalic acid, 3,4,6-trichlorophthalic acid, tetrachlorophthalic acid, 4-chloroisophthalic acid, 5-chloroisophthalic acid, tetrachloroisopathalic acid and tetrachloroterephthalic acid. Of course, when the anhydride of any of these acids exists, it may be employed instead of the acid, and it will be understood that the term acid is used herein to include the anhydride. Examples of chloro-substituted phthalic anhydrides include: 4-chlorophthalic anhydride, 3-chlorophthalic anhydride, 3,6- dichlorophthalic anhydride, 4,5-dichlorophthalic anhydride and tetrachlorophthalic anhydride. The di- and tetra-chloro-substituted phthalic acids are preferred because they are the most readily available. Furthermore, the more highly chlorinated phthalic acids, such as tetrachlorophthalic acid, are particularly desirable because they impart the most marked improvements in water resistance, insulation resistance and other electrical properties to polymerized compositions of the invention, as hereinafter further discussed.

A dicarboxy alkene having from four to five carbon atoms in which the carboxy radicals are attached to adjacent carbon atoms is an acid of the class consisting of maleic, fumaric, itaconic, citraconic and mesaconic acids. The anhydride of any of these acids, when such anhydride is available, may be used instead of the acid. It will be understood that the expression dicarboxy alkene includes the anhydride.

The polymerizable unsaturated alkyd in a composition of the invention is thus a polyester prepared by reaction of one or more polyhydric alcohols and a mixture of polycarboxylic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the alkyd there may be maximum esterification of the hydroxy and carboxy groups without attainment of excessive viscosity (i. e., through cross-linking); i. e., approximately equimolar proportions are used or a small excess of the polyhydric alcohol not exceeding about 10% by weight based on the stoichiometric amount of alcohol required. The alkyd may be an ester of the mixture of polycarboxylic acids with any glycol, such as any polymethylene glycol in the series from ethylene glycol to decamethylene glycol, propylene glycol, any butylene glycol, any polyethylene glycol in the series from diethylene glycol to nonaethylene glycol, disecondary glycols such as pentandiol-2,4-dipropylene glycol, and butandiol-2,3, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Also, the polyhydric alcohol used may be one whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3, or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

In addition to a chloro-substituted phthalic acid, another saturated dicarboxylic acid (or mixture of such acids) may be used in the preparation of the polymerizable unsaturated alkyd. Such a saturated dicarboxylic acid may be any normal acid in the series from oxalic acid and malonic acid to sebacic acid, or any benzene dicarboxylic, naphthalene dicarboxylic or cyclo-hexane dicarboxylic acid, or any diglycolic, dilactic or resorcinol diacetic acid. However, since at least 60 percent of the polycarboxylic acid radicals in the alkyd are derived from a dicarboxy alkene, the total proportion of saturated dicarboxylic acids cannot be greater than 40 mol percent of the polycarboxylic acid component in the alkyd. A molding composition in which the proportion of saturated dicarboxylic acid radicals in the unsaturated alkyd is higher than about 40 percent of the polycarboxylic acid radicals tends to be soft and cheesy and cannot be molded into articles having satisfactory properties.

At least 4 percent of the polycarboxylic acid radicals in the alkyd must be derived from a chloro-substituted phthalic acid in order to achieve the improvements obtained in the practice of the invention. Thus, the proportion of saturated dicarboxylic acids other than chloro-substituted phthalic acids cannot be higher than 36 mol percent of the polycarboxylic acid component in the alkyd. In general, the greatest improvements in the physical and chemical properties of polymerized alkyd compositions of the invention are obtained when the proportion of chloro-substituted phthalic acid is approximately 15 to 30 mol percent of the polycarboxylic acid component in the unsaturated alkyd, as hereinafter further discussed. Thus, the proportion of saturated dicarboxylic acids other than chloro-substituted phthalic acids is preferably not higher than about 10 to 25 mol percent of the polycarboxylic acid component.

In the practice of the invention the preferred polymerizable unsaturated alkyds are the so-called "linear" alkyds, i. e., those which have very little cross-linking in the alkyd molecules, as evidenced by the fact that such alkyds are soluble in solvents such as acetone. Such alkyds are formed mainly by esterification of a dihydric alcohol and a dibasic acid. Of course, such alkyds are really only "substantially" linear since it is not possible to avoid all cross-linking, at least through the unsaturated bonds in the alkyd molecules. In fact, a linear (or substantially linear) alkyd may be obtained even though in the preparation of such alkyd a small proportion of the dihydric alcohol (e. g., less than about 5 mol percent of the alcohol) is replaced by a polyhydric alcohol containing more than two alcohol radicals, such as glycerol or pentaerythritol, or a small proportion of the dibasic acid (e. g., less than about 5 mol percent of the acid) is replaced by a polybasic acid containing more than two acid radicals, such as citric acid. The preferred linear alkyd for use in the practice of the invention is prepared by carrying out the esterification reaction to produce an alkyd having a viscosity of from 0.90 to 5.0, preferably from 0.95 to 3.15 poises, and an acid number of from 10 to 35, preferably from 15 to 27. When the esterification is carried out to this extent the resultant alkyd will be soluble in solvents such as methyl Cellosolve, acetone, methylene chloride and diethyl phthalate.

Although the esterification reaction is usually carried out under an inert gas atmosphere so as to exclude oxygen, various inhibitors may be used to prevent appreciable polymerization of the alkyd during the esterification reaction.

In the preparation of the polymerizable unsaturated alkyd, any of the usual modifiers such as monobasic acids, monohydric alcohols and natural resin acids may be added. The larger the proportions of monobasic acid and monohydric alcohols, the lower is the average number of acid and alcohol residues in the resulting alkyd molecules, and the lower is the viscosity of the alkyd. On the other hand, the more nearly equal the molecular proportions of the dibasic acids and dihydric alcohols, the greater is the average number of residues in the resulting alkyd molecules, and the greater is the viscosity. The proportions of ingredients used are those proportions that produce a polymerizable alkyd having a viscosity and acid number above indicated. In the practice of the invention it is desirable that the proportion of monobasic acids and monohydric alcohols be kept low enough to allow substantial growth of the chain-like molecules during preparation of the unsaturated alkyd, since the presence of a substantial proportion of such monobasic acids and monohydric alcohols retards the chain growth of the alkyds and produces alkyds which may not harden satisfactorily.

The effect of the addition of a small proportion of a monohydric alcohol or a monobasic acid upon the chain growth of an alkyd is dependent to a great extent upon the degree of reaction attained before such a monofunctional acid or alcohol is added. For example, if added at the beginning of the reaction of a dibasic acid with a dihydric alcohol, each molecule of the monofunctional ingredient which reacts with a difunctional acid or alcohol stops the growth of that alkyd chain in one direction so that long chain molecules of the alkyd are difficult to obtain under such conditions. However, if added when the reaction of dibasic acid and dihydric alcohol is almost complete so that fairly long chains have already been built up, the monofunctional ingredient merely esterifies those end groups present in the existing alkyd chains and, therefore, a small amount may be incorporated in the alkyd without having any deleterious effect upon the final product.

In the production of polymerizable unsaturated alkyd compositions in the practice of the invention, the proportion of monohydric alcohol or monobasic acid used is never above 10 mol percent of the acid or alcohol content. Ordinarily the proportion of monohydric alcohol or monobasic acid that may be incorporated in polymerizable unsaturated alkyds for use in molding compositions of the invention is not more than about 5 mol percent of the alcohol or acid content. However, polymerizable unsaturated alkyds for use in the practice of the invention usually contain not more than about 2 mol percent of monofunctional acid or alcohol in order that such alkyds may be readily polymerized into infusible or high melting point resins.

The temperature at which the esterification is carried out will depend on the particular conditions under which this reaction is effected, the polycarboxylic acids and other reactants used, whether or not a solvent is present, etc. If desired the reaction may be expedited by the use of an acid substance as a catalyst, any organic acid, inorganic acid or acid salt that is soluble in the reaction mixture may be employed as a catalyst, but it is desirable that any acid substances used be readily volatile or be of such a character that it has no deleterious effect on the final product. The amount of acid catalyst employed is simply that amount which accelerates the esterification to the desired degree. To prevent premature polymerization an inhibiting agent may be added before the esterification is carried out. Whenever added, the inhibiting agent is used in the proportion required to give the desired degree of inhibiting effect. Any desired anti-oxidant, such as hydroquinone, pyrogallol, tannic acid or any aromatic amine, such as aniline or phenylene diamine may be employed as an inhibitor.

The preparation of the unsaturated alkyd preferably is carried out in an atmosphere of an inert gas, such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen during the reaction is desirable not only because oxygen causes discoloration, but also because it tends to produce premature polymerization at the elevated temperatures used.

The amorphous unsaturated alkyd resin may be prepared, for example, as follows:

A mixture of maleic anhydride (0.8 mol), tetrachlorophthalic anhydride (0.2 mol), monoethylene glycol (0.85 mol), propylene glycol (0.2 mol), and an amount of hydroquinone equal to 0.06% of the charge are mixed together in a three-necked flask fitted with a thermometer, a tube leading to a condenser and an inlet tube through which is introduced a moderate stream of carbon dioxide. The flask is lowered into an oil bath and the mixture is held at a temperature of about 175° C. for one hour. The mixture is then heated at 230° to 235° C. for about three hours to obtain an alkyd having an acid number of about 23.7 and a viscosity of about 1.35 poises.

DIALLYL PHTHALATE

The relative proportions of diallyl phthalate and alkyd resin in the molding composition, as above indicated, depends on the average number of chlorine atoms in the chloro substituted phthalic acid employed in producing the alkyd resin. Using all monochlorophthalic acid as the chloro substituted phthalic acid constituent in producing the alkyd, the amount of which constituent, as above noted, may vary from 4 mol percent to 40 mol percent, of the poly carboxylic acids employed in making the alkyd, the maximum amount of diallyl phthalate may be from 10% to 19% by weight of the mixture (diallyl phthalate plus alkyd resin) respectively. Hence, the amount of diallyl phthalate in the mixture of diallyl phthalate and alkyd resin may vary from within the range of from 10% to 12%, when employing 4 mol percent of monochlorophthalic acid in producing the alkyd resin, to within the range of from 10% to 19%, when employing 40 mol percent of monochlorophthalic acid in producing the alkyd resin. Utilizing dichlorophthalic acid in producing the alkyd resin, the amount of diallyl phthalate in the mixture of diallyl phthalate and alkyd resin may vary from within the range of from 10% to 13.5% (when using 4 mol percent dichlorophthalic acid in producing the alkyd) to within the range of from 10% to 22.5% (when using 40 mol percent of dichlorophthalic acid in producing the alkyd). Employing tetrachlorophthalic acid in producing the alkyd resin, the amount of diallyl phthalate admixed with the alkyd resin may vary from within the range of from 10% to 16% (when using 4 mol percent of tetrachlorophthalic acid in producing the alkyd) to within the range of from 10% to 30% (when using 40 mol percent of tetrachlorophthalic acid in producing the alkyd).

FILLER

The filler in a molding composition of the invention may comprise an organic filler (i. e., a filler from a vegetable or animal source) or an inorganic or mineral filler, or combinations of certain inorganic fillers and organic fillers. Organic fillers include alpha cellulose, which is the purest and lightest-colored organic material ordinarily available. Inorganic or mineral fillers include fibrous fillers, such as glass fibers or silicate fibers (as hereinafter defined) and non-fibrous fillers, such as ground glass or clay.

A non-fibrous inorganic filler which may be used in the practice of the invention is ordinary kaolin, i. e., Georgia clay, or dehydrated kaolin or resin-coated kaolin particles, as hereinafter described. Dehydrated kaolin may be prepared by heating ordinary kaolin in a rotary kiln at a temperature sufficient to drive off the chemically combined water, i. e., at least about 600° C., but below the temperature which would produce sintering of the kaolin, i. e., about 1200° C. If desired, a salt or hydroxide of an alkali or alkaline earth metal or of an amphoteric metal, e. g., sodium chloride, potassium chloride, sodium bromide, sodium nitrate, sodium sulfite, sodium hydroxide, calcium chloride, magnesium chloride, aluminum chloride, zinc chloride, or mixtures thereof, may be incorporated in the kaolin before heating. For example, dehydrated kaolin may be prepared by pulverizing ordinary kaolin (600 pounds) and sodium chloride (18 pounds) and heating the mixture in a batch-type rotary kiln for about 5 hours at a temperature of about 785° C. to produce a loss in weight of about 14.8% of the mixture. If such a procedure is carried out at temperatures ranging from 900° to 965° C. the loss of weight of the mixture is about 15.0%.

The term "resin-coated kaolin particles" is used herein to mean kaolin particles which have been coated with a thermosetting reaction product of formaldehyde and a substance whose molecule has a plurality of $NH_2$ groups each connected to a carbon atom contained in a heterocyclic ring, the carbon atoms being connected by a double bond to an intracyclic nitrogen atom, said $NH_2$ groups being resin-formingly reactive with formaldehyde. (Such a substance is referred to hereinafter, for the sake of brevity, as a "heterocyclic polyamine.") The amino groups are resin-formingly reactive with formaldehyde in that they are the functional points in the molecule of the heterocyclic polyamine at which formaldehyde reacts during the resin-forming reaction and in that the reactivity of such amino groups is not impaired appreciably or interfered with by other reactive groups, such as, for example, OH groups, in the molecule of the heterocyclic polyamine.

In general, the proportion of formaldehyde actually reacting may range from one-half to a maximum of two molecules for each amino group. An excess of formaldehyde above this maximum may be used for the reaction, if desired, although an uncombinable excess of one of the reactants usually is not desirable in the final product. Because of the complexity of the molecules of the reaction products that are produced, the proportion of formaldehyde actually reacting may vary freely between the limits stated. The preferred proportions vary, of course, with the specific substance that is reacted with formaldehyde. For example, when the substance is melamine, the preferred proportions are about 3 mols of formaldehyde for each mol of melamine. Other examples of preferred molar ratios of formaldehyde to a heterocyclic polyamine in the preparation of a resinous reaction product for the coating of kaolin particles are 2:1 for guanazole or 1-carbamyl guanazole, 4:1 for 2,4-diamino-6-hydroxy pyrimidine, 3:1 for 2,4-diaminoquinazoline, 2:1 for formoguanamine, acetoguanamine or benzoguanamine and 5:1 for adipoguanamine or sebacoguanamine.

The reaction proceeds at normal temperatures, but heating ordinarily is desirable to shorten the time of reaction, or, in some cases, to dissolve the substance to be reacted with formaldehyde. The desired resin solution ordinarily is obtained by carrying the reaction only to its earliest stage, for example, the stage at which the reacting ingredients have just dissolved to form a solution, or for a few additional minutes thereafter.

When the reaction between formaldehyde and a heterocyclic polyamine is substantially complete, the solution of the reaction product is used to coat kaolin particles by the procedure hereinafter described. The preferred heterocyclic polyamine is melamine, since melamine-formaldehyde resin-coated kaolin particles in particular enhance the excellent water resistance and electrical properties of compositions of the invention.

In the preparation of resin-coated kaolin particles, a heterocyclic polyamine-formaldehyde reaction product solution, prepared as hereinbefore described, is diluted with water or any suitable solvent so that the volume of the resin solution is such that it may be used to deposit only a very small amount of the resin as a coating on the kaolin, the extent of the dilution varying, of course, with the procedure employed for applying the resin to the kaolin, as is hereinafter further discussed. The dilution should be made carefully so that the resin does not precipitate as the water is added. It is desirable that before dilution the pH of the resin solution be adjusted, e. g., with dilute lactic acid, so that it is on the slightly acid side, to prevent precipitation of methylols upon dilution and to promote condensation of the resin.

When the reaction product has thoroughly coated the kaolin particles, it is desirable that the material be subjected to strong heating, since the heterocyclic polyamine-formaldehyde reaction product should be in at least a relatively advanced state of condensation. It is ordinarily desirable that the reaction product be in an infusible state, but at least the resin on the kaolin particles should be sufficiently condensed that neither water nor formaldehyde will be liberated in substantial amounts during further processing operations in the preparation of a composition of the invention. Although the slightly acid pH of the coating solution may aid the cure initially, several hours of heating may be necessary at an elevated temperature to bring the resinous substance to a sufficiently advanced state of condensation, or to an infusible state, in accordance with the preferred procedure. Any desired method may be used to coat the kaolin particles with the resin, so long as care is taken to avoid agglomeration of the kaolin particles. Of course, the preferred procedures are those which result in the least change in the physical characteristics of the kaolin particles. For example, the kaolin may be stirred into a highly dilute solution of the desired resin to form a slurry that can be readily atomized for spray drying to obtain finely-divided resin-coated kaolin particles, or the slurry can be vacuum drum-dried and ball-milled or hammer-milled to a finely pulverized form. Alternatively, a dilute resin solution may be absorbed on the kaolin particles in a mixer and the resulting mass dried on trays at an elevated temperature, e. g., at about 160° F. before grinding it to the desired particle size by any known procedure.

The proportion of a heterocyclic polyamine-formaldehyde reaction product solution used to coat kaolin particles may vary with the specific reaction product employed as well as with the degree of improvement in properties that is desired. Ordinarily, it is preferred that approximately 2% to 30% of the final dry coated kaolin particles consist of the thermosetting heterocyclic polyamine-formaldehyde reaction product, preferably in its infusible state, and it is most desirable that from about 5% to about 15% of the final dry coated kaolin particles consist of the reaction product. The terms "percent" and "parts" are used herein to mean percent and parts by weight unless otherwise specified.

If the heterocyclic polyamine used is one that reacts so rapidly with formalin that the reaction product reaches the insoluble stage almost immediately after the reactants are mixed and heated (guanazole is an example of such a heterocyclic polyamine), it is preferable simply to mix the polyamine and the formalin at room temperature and then to add the water of dilution, and the acid to adjust the pH. The relatively clear solution so obtained is then mixed with the kaolin particles, which are thoroughly dried in accordance with any of the procedures hereinbefore described. Thus, the reaction between the heterocyclic polyamine and formaldehyde actually takes place on the kaolin particles during the drying operation.

A fibrous inorganic filler used in the practice of the invention may consist of fibers of crystalline fibrous silicates consisting essentially of anhydrous silicates of divalent metals, or such fibers which are resin-coated.

Crystalline fibrous silicates consisting essentially of silicates of divalent metals are obtained from relatively few families, the most important of which are the serpentines and the pyroboles. The most important fibrous serpentine is chrysotile, $3MgO.2SiO_2.2H_2O$, a hydrous silicate of magnesium, generally referred to simply as "asbestos" because of its industrial prevalence. The fibrous silicates that are preferably employed in the practice of the invention are anhydrous and are therefore distinguished from the serpentines, such as chrysotile, which are hydrous silicates. A mineral sometimes classified as a fibrous pyrobole is crocidolite, $Na_2O.Fe_2O_3.2FeO.6SiO_2$ (with up to about one mol of $H_2O$ of hydration). The fibrous silicates that are preferably used in the practice of the invention are silicates of divalent metals and are, therefore, distinguished from crocidolite which consists essentially of silicates of metals other than divalent metals.

Although the crystalline silicate mineral fibers, which are preferably used in the practice of the invention (for the sake of brevity, hereinafter referred to simply as "silicate fibers"), may be fibers of any one or more of the crystalline fibrous minerals consisting of anhydrous silicates of divalent metals, practically the only members of this group which are available for industrial purposes are members of the pyrobole family. The pyroboles that are preferably used as fillers in the production of compositions of the invention are minerals consisting essentially of silicates of divalent metals having the general chemical composition: $MO.SiO_2$, wherein M is a divalent metal; but they may also contain small amounts of monovalent metals, e. g., sodium or potassium, and trivalent metals, e. g., ferric iron and aluminum. Examples of the pyroboles that may be used in the practice of the invention include:

Diopside, $(Ca, Mg)O.SiO_2$, essentially a silicate of calcium and magnesium;

Wollastonite, $CaO.SiO_2$, a relatively pure silicate of calcium;

Anthophyllite, $(Mg.Fe)O.SiO_2$, essentially a silicate of iron and magnesium, usually with a little aluminum;

Tremolite, $3MgO.CaO.4SiO_2$, a relatively pure silicate of magnesium and calcium;

Actinolite, $3(Mg, Fe)O.CaO.4SiO_2$, similar to tremolite, but containing at least 3% by weight of FeO; and Others descriptively named mountain leather and mountain cork.

The pyroboles are further classified in two distinct classes or families, viz., amphiboles and pyroxenes. According to J. W. Mellor in "Inorganic and Theoretical Chemistry" (Longmans, Green and Co., 1925), volume VI, pages 390 to 391, diopside and wollastonite are pyroxenes; and anthophyllite, tremolite and actinolite are amphiboles.

The fibrous silicates which may be used as fillers in molding compositions of the invention naturally differ among themselves in respect to the improvements they impart, to some extent, and also in respect to certain other valuable characteristics. For example, the amphiboles, particularly tremolite and anthophyllite, appear to possess stronger and more flexible fibers than the pyroxenes, and the amphiboles are therefore preferred in the practice of the invention. Also, the amphibole fibers, particularly anthophyllite, impart the best storage stability to molding compositions of the invention. On the other hand, other characteristics may be controlling in the selection of silicate fibers. For example, the most pronounced improvement in water resistance is obtained in products containing anthophyllite or wollastonite fibers, and therefore such fibers are preferred when maximum water resistance is desired. At present, anthophyllite is the least expensive pyrobole and, therefore, its fibers are preferred, if low cost is important. On the other hand, if color is a controlling factor, the fibers of the white pyroboles, e. g., tremolite, wollastonite, diopside, and actinolite in some instances, are preferred.

Fibrous silicates for use in the practice of the invention are available commercially in the form of the crude ore from the mine and in the form of fibers obtained by milling the ore, e. g., in a crusher, and then separating the fibers from the rock residue, e. g., by suction. Ordinarily, the fibers commercially available must be purified further for use in the invention, since such fibers usually contain a substantial amount of mineral impurities which affect deleteriously many of the properties of the products of the invention. The necessity and extent of purification for the purposes of the invention are determined by the nature of the impurities, their effect on the mechanical strength of molded articles and their damaging effect on the mold itself. Silicate fibers sufficiently purified for the purposes of the invention may be obtained by carrying out a simple flotation process, e. g., by introducing water continuously into the bottom of a vessel equipped with an overflow and containing the silicate fibers, so that the impurities remain at the bottom of the vessel and the purified fibers float out with the overflowing water. If extreme purity of the fibers is required, tremolite fibers are preferred, since tremolite occurs naturally in a very pure state and often requires little or no further purification.

Fibrous silicates, as contrasted to massive silicates occur in various fiber lengths ranging up to as much as 7 inches. The fiber lengths are reduced substantially in the ordinary milling process, although in some instances the initial fibers are of a short needle-like or rod-like structure. No particular fiber length is required for use in the practice of the invention. For example, the fibers may be ground down to the size of ordinary fibrous fillers used in molding compounds, i. e., the fiber lengths of groups No. 6 and No. 7 of the Canadian Asbestos classification, at which the fibers appear to the naked eye to be similar in form to sawdust.

Silicate fibers coated with a thermosetting reaction product of formaldehyde and a heterocyclic polyamine may be prepared by any of the procedures hereinbefore described for preparing resin-coated kaolin particles, the proportion of the reaction product employed preferably being such that it comprises from about 2% to about 25% of the final coated fibrous silicate filler, and most desirably from about 5% to about 15% of the final coated fibrous silicate filler.

The use of resin-coated silicate fibers or resin-coated kaolin particles as a filler in a polymerizable unsaturated alkyd molding composition improves the water resistance and electrical properties of the composition. When the resin used to coat the filler is a melamine-formaldehyde resin, the flame resistance of the composition is also improved.

Although any of the inorganic fillers hereinbefore described, i. e., kaolin, dehydrated kaolin, resin-coated kaolin particles, glass fibers, silicate fibers, or resin-coated silicate fibers, may be used as the sole filler in a molding composition of the invention, it is preferable that the filler comprise a combination of fibrous and non-fibrous inorganic fillers. For example, a filler combination comprising dehydrated kaolin and silicate fibers, e. g., anthophyllite fibers, not only imparts better molding properties to a polymerizable unsaturated alkyd composition than the molding properties of an alkyd composition containing dehydrated kaolin as the sole filler, but the use of such a filler mixture also improves the impact strength of articles molded from the composition. The preferred combinations of fillers include: mixtures of kaolin (or dehydrated kaolin or resin-coated kaolin) and silicate fibers, and mixtures of resin-coated silicate fibers and kaolin or resin-coated kaolin.

Fillers comprising mixtures of kaolin, or, preferably, resin-coated kaolin particles, and cellulose may also be used in the practice of the invention. The term "cellulose" is used herein to include any form of cellulose filler, for example, alpha cellulose, shredded paper, chopped cloth, e. g., canvas, cotton flock, cotton linters, purified wood fibers in finely ground forms or in felted-fiber forms, cotton cord or regenerated cellulose. Resin-treated cellulose, i. e., cellulose which has been impregnated with a thermosetting heterocyclic-polyamine formaldehyde reaction product converted to its infusible state on the cellulose, is prepared by a procedure similar to that described for the preparation of resin-coated kaolin particles. A heterocyclic polyamine-formaldehyde reaction product solution, prepared as hereinbefore described, is diluted with water or any suitable solvent so that the weight of the diluted solution is from two to three times the weight of the cellulose to be treated. (The weight of the cellulose is always taken as its bone dry weight. The cellulose employed need not be bone dry, of course, so long as its water content is accounted for in calculating its weight.) The dilution should be made carefully so that the resin does not precipitate as the water is added. It is desirable that the pH of the resin solution be adjusted, e. g., with dilute lactic acid, so that it is on the slightly acid side, since the resin cures to its infusible state on the filler more rapidly in a slightly acid condition. (The preferred pH varies in accordance with the particular heterocyclic polyamine-formaldehyde reaction product solution employed. Melamine-formaldehyde reaction product solutions are preferably used at a pH between 5 and 6.)

When the reaction product has thoroughly impregnated the cellulose filler, it is essential that the material be thoroughly dried and that the resinous reaction product be cured on the filler to the infusible state. Although the slightly acid pH of the impregnating solution aids the cure initially, several hours of heating may be necessary at an elevated temperature to completely "deaden" the resinous substance. (Melamine-formaldehyde resins derived from solutions having a pH between 5 and 6 usually cure in about 3 hours at temperatures ranging from 200° to 225° F.) The completeness of cure may be checked from time to time during the curing operation by boiling a sample of the treated filler in water. If the cure is still incomplete, a cloudy supernatant liquid will result because of dissolved resinous reaction product. On the other hand, if the supernatant liquid is clear, complete cure is indicated.

The proportion of a heterocyclic polyamine-formaldehyde reaction product solution used to impregnate a cellulose filler should be such that from 2.5% to 40% of the final treated dry filler consists of the heterocyclic polyamine-formaldehyde reaction product in its infusible state. It is preferred that the proportion of the reaction product solution be such that from about 14% to about 25% of the final treated filler consists of the reaction product in its infusible state.

The improvements obtained in the practice of the invention are enhanced when the filler comprises a base of a metal of group II of the periodic system. In addition to reducing the tackiness of a polymerizable unsaturated alkyd molding composition of the invention, as hereinafter further discussed, such a metal base imparts a certain stiffness to the composition, thereby making the composition much easier to handle industrially. Also such a metal base in a polymerizable alkyd composition reduces substantially the tendency of the composition to stain or corrode a steel mold. Furthermore, such a base not only imparts a substantial improvement in the physical and chemical properties of the composition but also imparts an improvement in the water-resistance and electrical properties of articles molded from the composition. One of the functions of the metal base is the neutralization of the free carboxylic acid radicals in the alkyd (although the improvements obtained by the use of a metal base cannot be explained fully as being the result of such neutralization); therefore, a metal base, such as an oxide, which does not release a volatile material during neutralization is preferred.

The metals of group II of the periodic system include magnesium (atomic weight=24.3), calcium atomic weight=40.1), zinc (atomic weight=65.4), strontium (atomic weight=87.6), cadmium (atomic weight=112.4), barium (atomic weight=137.4) and mercury (atomic weight=200.6). It is believed that beryllium (atomic weight=9) and radium (atomic weight=226.0) are too rare and expensive to be considered, and, accordingly, the metals of group II having atomic weights between 10 and 220 are the metals from which the base is formed that may be used in the practice of the invention.

A metal base may be defined as a compound which reacts with an acid to replace the "acid" hydrogen atom with the metal cation of the metal base, thereby forming the metal salt of such acid. Such a definition necessarily makes the meaning of the term "metal base" dependent, in part at least, upon the acid present. It is to be understood that the base of a metal of group II, as referred to herein, is one that is in fact a metal base with respect to the polymerizable polyester, which is present in the practice of the invention. In other words, the metal base is a compound which releases its cation to replace the hydrogen of the carboxy radicals in the polymerizable polyester. Presumably, such a carboxy radical acts as an acid in that it displaces acids weaker than itself from their salts, but will not displace acids stronger than itself from their salts. However, the term "metal base" does not include those metal salts, such as zinc stearate, which are used as lubricants or other modifiers in a polyester resin, because the salts of such long chain, i. e., over 6 carbon atoms, carboxylic acids apparently are not reactive enough to release the metal cation to replace the hydrogen of the carboxy radicals.

It has been found that the metal base used in the practice of the invention must be the substitution product of a substance with a labile hydrogen atom, having a dissociation constant at least as small as about $3\times10^{-7}$, in which the labile hydrogen atom has been replaced by a valence of a metal of group II. In other words, in order that a compound of such a metal may be basic, it must be a compound of such a metal with a substance having a dissociation constant equal to or less than that of carbonic acid. The most common examples of such metal bases include the oxides, hydroxides, borates, carbonates, and alcoholates, such as the methoxides and ethoxides of such metals. Zinc oxide and barium carbonate are particularly desirable metal bases in the practice of the invention.

ORGANIC PEROXIDE CATALYST

The preferred catalyst for use in the practice of the invention is benzoyl peroxide, but any other organic peroxide (not containing polymerization-inhibiting radicals), such as succinyl peroxide, t-butyl perbenzoate, di-t-butyl perphthalate, acetyl peroxide, peracetic acid, perbenzoic acid, toluyl peroxide, p-bromobenzoyl peroxide, anisoyl peroxide, chloroacetyl peroxide, acetyl benzoyl peroxide, diacetyl peroxide and furoyl peroxide, may be used.

The proportion of curing catalyst used in the production of a molding composition of the invention is simply the proportion that causes the composition to polymerize at the desired rate, and as the term "catalyst" implies, such proportion is the usual catalytic amount, i. e., ranging from about 0.01% to about 5% of the composition. The preferred proportion of curing catalyst varies with the different catalysts, and the amount of any particular curing catalyst required to produce a given rate of hardening may vary also with variations in the nature of the polymerizable composition.

PREPARATION OF MOLDING COMPOSITION

The solid molding composition of this invention comprises a filler, a catalyst, pigment, if used, other additives, if desired, and as a binder a polymerizable unsaturated alkyd of the type hereinbefore described and diallyl phthalate in the proportions hereinbefore indicated. The amount of such additives is the usual amount consistant with their particular function in the molding composition.

In the production of the molding compositions embodying the invention, the filler, the alkyd, the diallyl phthalate, catalyst and any additives are mixed in the proper proportions indicated above under conditions such that substantially no reaction takes place between the diallyl phthalate and the alkyd and no further polymerization of the alkyd occurs. Mixing of the filler with the other ingredients may be carried out in any suitable mixing or kneading apparatus, e. g., by using any commercial mixer or by milling the filler into the material in a heated two roll (differential speed) rubber mill. In the absence of a solvent the mixing must be done at elevated temperatures in order to impart sufficient plasticity to the alkyd to permit the uniform homogeneous distribution of the filler and other additives therein. It is essential that the maximum temperature of mixing not exceed 180° F. once the catalyst is introduced, and it is desirable that the temperature not exceed 170° F. Temperatures in excess of 180° F. effect activation of the catalyst through decomposition thereof which, in turn, promotes premature polymerization of the binder components. The minimum temperature may vary depending upon the particular constituents mixed together and should be such as to provide a consistency which will permit the incorporation of the filler within the resin to produce a substantially homogeneous mixture. In general, temperatures below 115° F. will be found inadequate to impart sufficient plasticity to the alkyd to obtain the desired product.

If desired a solvent, such as methylene chloride, acetone or methyl cellosolve, may be employed to dissolve the alkyd and thus fluidize it so as to permit mixing of the constituents to obtain a uniform product. Employing such solvent the alkyd is dissolved, the diallyl phthalate is added, followed by a portion of the filler and the catalyst and the resultant slurry mixed by a large blade paddle stirrer at room temperature. When this slurry is uniform, the remainder of the filler is added and the mixing continued until a uniform mixture results. Thereafter the solvent is removed. This can be done at room temperature by allowing the mixture to set, by drying under vacuum or by spreading the mixture in trays and drying in an oven at a moderate temperature. When removing the solvent, the maximum temperature utilized should not exceed 180° F. and preferably not exceed 170° F. for the reasons stated in the preceding paragraph.

When a homogeneous composition is obtained it may be rolled into thin sheets which may be used as such, after cutting into suitable lengths, or which can be granulated (usually to a particle size not greater than about ⅛ inch) by any of the well-known industrial devices for reducing material to particulate form by a cutting action. Although one of the simplest methods of granulating the material involves pressing the material through a fine mesh screen, it is preferable from an industrial point of view to employ devices capable of effecting a high speed cutting action. It has been found that, when the material is subjected to a high speed cutting action (either by causing rapidly moving blades to strike the material or by causing the material to be thrown at a high speed against stationary blades), the benefit of impact as well as shearing force is obtained and division of the material into fine particles is accomplished in a very satisfactory manner. Industrial devices which employ a high speed cutting action (and which are preferred therefore) include the Abbe cutter, the Wiley mill and the Fitzpatrick comminuting machine.

The term "non-tacky" is applied to compositions of the invention to indicate that such compositions do not tend to coalesce, i. e., are non-lumping, under ordinary storage conditions. A composition which may be granulated but the granules of which are tacky or sticky will cake and lose its free-flowing form when the composition is placed in a container, as it ordinarily is during storage. Obviously, a material comprising an abnormally high filler content, e. g., 95%, with a relatively low resin content, e. g., 5%, is non-tacky, since any tackiness possessed by the resin is masked by the large excess of filler. Such a material is not a molding composition because its resin content is too low to render the material plastic at molding temperatures and pressures. Nor is such a material granular since there is insufficient resin to bind the filler particles together in granules. On the other hand, an extremely low proportion of filler with a relatively high proportion of resin gives a composition that is a putty regardless of the characteristics of the resin.

In general, the proportion of filler in a molding composition of the invention may range from the minimum amount capable of appreciably improving the physical properties of the hardened product, i. e., about 50% of the composition, to the maximum proportion which may be held together or bound satisfactorily by the binder, i. e., about 85% of the composition.

Ordinarily, when the filler in a composition of the invention is a non-fibrous inorganic filler, i. e., kaolin, dehydrated kaolin or resin-coated kaolin particles, it may be from about 50% to about 85% of the composition. It is preferred, however, that a non-fibrous inorganic filler be from about 62½% to about 72½% of the composition.

Ordinarily, when the filler in a composition of the invention is a fibrous inorganic filler, i. e., a fibrous silicate filler or a resin-coated fibrous silicate filler, it may be from about 50% to about 75% of the composition, and preferably is from about 60% to about 70% of the composition.

When the filler in a composition of the invention comprises a mixture of fibrous and non-fibrous inorganic fillers, it is preferred that the proportion of filler be from about 60% to about 70% of the molding composition. At least an appreciable amount of both the fibrous and non-fibrous inorganic fillers is used in such a mixture in order to obtain the benefit of the improvements which are imparted by each type of filler. As a rule, the proportion of non-fibrous filler to fibrous filler in the mixture may range from the minimum proportion at which the effect of the non-fibrous filler is noticeable, i. e., about 1:100, to the maximum proportion at which the effect of the fibrous filler is noticeable, i. e., about 6:1, the preferred proportions being in the upper portion of the range, for economic reasons. The optimum results are obtained at a ratio of non-fibrous to fibrous filler ranging from about 1:1 to about 2:1.

When the filler comprises a mixture of a non-fibrous inorganic filler and cellulose, as hereinbefore described, the proportion of non-fibrous filler to cellulose may range from about 4:1 to about 1:4, the total proportion of such filler mixture in a composition of the invention preferably being from about 55% to about 65% of the composition.

The full benefit of the use of a base of a metal of group II of the periodic system, as hereinbefore described, in the practice of the invention is obtained simply by incorporating the metal base in the alkyd composition in the same manner as any filler, according to the procedures hereinbefore described. The metal base may be incorporated in the alkyd in a separate step or at the same time as the fillers hereinbefore mentioned. In fact, although the metal base has several chemical functions, it also functions physically as part of the filler. In determining the total amount of filler, the amount of metal base is added to the amount of other inorganic filler used, and the total proportion of inorganic filler thus calculated should be within the limits hereinbefore described.

In actual practice the amount of the metal base used may range from a mere appreciable amount based on the chemical function of the metal base, i. e., the slightest excess over that amount required to neutralize the alkyd, so that even with a theoretically complete reaction there would still be a slight amount of metal base present, to a maximum proportion which depends upon the properties of the individual metal base. The considerations involved include the alkalinity, chemical activity and solubility of the metal base, as well as the physical character of the metal base when it is considered merely as a portion of the inorganic filler. Ordinarily the metal base is sufficiently inactive and insoluble so that the essential consideration in the determination of the maximum proportion is purely a physical matter, and such a base is considered a part of the filler. In a molding composition embodying the invention the preferred proportion of such a metal base ranges from about 2% to about 20% of the total filler. As hereinbefore stated, the use of a base of a metal of group II of the periodic system, such as zinc oxide or barium carbonate, greatly improves the water resistance and electrical properties of molded compositions of the invention. Such metal bases also contribute to the non-tacky granular form of the present compositions. Thus, when a metal base is used, the filler content of the compositions should not be in the upper portions of the ranges hereinbefore described, e. g., in general the filler should not be higher than about 70% to about 75% of the composition, although, of course, this range may vary with specific fillers, in order to avoid a powdery composition. On the other hand, when the proportion of filler is in the lower portion of the range, e. g., 50% to 60%, in general, a metal base may be required in order to avoid a tacky granular composition or even a putty.

The following examples illustrate the invention; it will be understood that the invention is not limited thereto.

EXAMPLE I (a) A polymerizable unsaturated alkyd (80.4 grams, prepared by esterifying 0.8 mol of ethylene glycol and 0.2 mol of propylene glycol with 0.6 mol of maleic anhydride and 0.4 mol of a mixture of dichlorophthalic anhydrides in the presence of an amount of hydroquinone equal to 0.06% of the charge by the procedure hereinbefore described to an acid number of about 22.9 and a viscosity of about 1.06 poises), is mixed in a Banbury mixer with diallyl phthalate (14.2 grams), a catalyst (3.74 grams of "Luperco ATC"), anthophyllite fibers (115 grams), kaolin (115 grams), zinc oxide (32.4 grams) and a lubricant (7.2 grams of zinc stearate). The mixing is continued until a soft, homogeneous dough is obtained. The material is then passed through warm rubber rolls to form sheets of a thickness of approximately ⅛ inch. The sheets are allowed to solidify fully while at a temperature below 90° F. and are then granulated in a high speed cutter to a maximum particle diameter of about ⅛ inch.

(b) The procedure described in (a) is repeated except that the proportion of the polymerizable unsaturated alkyd is 75.7 grams and the proportion of diallyl phthalate is 18.9 grams.

(c) The procedure described in (a) is repeated except that the unsaturated alkyd employed is prepared by esterifying 0.8 mol of ethylene glycol and 0.2 mol of propylene glycol with 0.8 mol of maleic anhydride and 0.2 mol of tetrachlorophthalic anhydride in the presence of an amount of hydroquinone equal to 0.06% of the charge by the procedure hereinbefore described to produce an alkyd having an acid number of 19.4 and a viscosity of 2.45 poises.

(d) The procedure described in (c) is repeated except that the proportion of the polymerizable unsaturated alkyd is 75.7 grams and the proportion of diallyl phthalate is 18.9 grams.

(e) The procedure described in (c) is repeated except that the proportion of the polymerizable unsaturated alkyd is 71 grams and the proportion of diallyl phthalate is 23.6 grams.

The compositions prepared as described in (a) through (e) above are non-tacky, granular molding compositions which retain their granular free-flowing form under ordinary storage conditions.

The compositions prepared as described in (a) through (e) above (the compositions being designated hereinafter as a, b, c, d and e, respectively) are molded for one minute under 1 to 4 tons of pressure per square inch of projected area in a mold heated with steam at 75 pounds gauge pressure to produce articles which are tested by the following procedures:

Water resistance varies with the amount of moisture that an article is capable of absorbing because the degree of deterioration upon exposure to moisture varies with the amount of moisture absorbed. Molded disks (2 inches in diameter) are immersed in water, and the water absorption is measured as gain in weight (in grams) during immersion. In Table 1 below, the water absorption is given for tests in which test pieces made from compositions of the invention, a through e (columns 2 through 5), are immersed in boiling water for one hour (line 1), or in cold water for 24 hours (line 2) or 48 hours (line 3) or 7 days (line 4).

The Barcol hardness of a disk molded from each composition is determined both before (line 5) and after (line 6) the disk is immersed in boiling water for one hour. Standard "Barcol" hardness apparatus is employed in this test, and hardness is read from a dial gauge which gives hardness readings as compared to an arbitrary standard.

The electrical properties of disks (⅛ inch thick and 4 inches in diameter) molded from compositions a through e are also shown in Table 1 below (lines 7, 8, 9, 10 and 11).

In an accelerated test used to determine the retention of insulation resistance by compositions embodying the invention, the polymerized compositions are exposed to high relative humidities and high temperatures for prolonged periods of time to promote the breakdown of their insulation resistance. The insulation resistance is determined by measuring the resistance (in megohms) offered to the flow of a current when a voltage is impressed between two electrodes so embedded in a molded article that there is a distance of 1¼ inches between the centers of the electrodes. Molded articles of compositions a through e are exposed to high temperatures and high relative humidities for given periods of time, and the insulation resistance is tested after exposure of the samples to such conditions. (The initial insulation resistance of each sample is over one million megohms.) The results of the insulation resistance tests after exposure to a temperature of 160° F. and a relative humidity of 95% for various lengths of time are given in Table 1 below.

*Table 1*

COMPOSITION

| | a | b | c | d | e |
|---|---|---|---|---|---|
| Percent Diallyl phthalate | 15 | 20 | 15 | 20 | 25 |
| 1. Boiling water, abs. 1 hr | .024 | .022 | .028 | .031 | .024 |
| 2. Cold water, abs. 24 hrs | .010 | .010 | .020 | .021 | .023 |
| 3. Cold water, abs. 48 hrs | .017 | .017 | .025 | .027 | .027 |
| 4. Cold water, abs, 7 days | .032 | .032 | | | |
| 5. Barcol Hardness (original) | 52 | 53 | 60 | 60 | 60 |
| 6. Barcol Hardness (after boiling) | 47 | 47 | 50 | 49 | 50 |
| 7. Dielectric constant (60 cycles) | 5.95 | 5.83 | 5.33 | 5.37 | 5.48 |
| 8. Power factor (60 cycles) | 4.2 | 4.0 | 4.0 | 4.4 | 4.8 |
| 9. Dielectric constant (10⁶ cycles) | 4.92 | 4.92 | 4.36 | 4.36 | 4.36 |
| 10. Power factor (10⁶ cycles) | 1.10 | 1.10 | 1.35 | 1.37 | 1.39 |
| 11. Arc resistance | 183 | 183 | 184 | 185 | 185 |
| 12. Insulation Resistance (meg.): | | | | | |
| 2 days | 4,500 | 1,100 | | | |
| 3 days | | | 1,430 | 3,450 | 11,750 |
| 5 days | 1,400 | 770 | 400 | 835 | 1,890 |
| 7 days | 1,000 | 1,200 | | | |
| 10 days | | | 25 | 103 | |
| 11 days | 130 | 630 | | | |
| 13 days | | | 8.3 | 40 | |
| 15 days | 48 | 290 | | | |

As the results in Table 1 indicate, molding compositions of the invention can be molded to produce articles which have considerably greater water resistance than articles molded from an unsaturated alkyd molding composition heretofore known. Furthermore, after exposure to high humidity, the Barcol hardness of articles molded from compositions of the invention is greater than that of articles molded from molding compositions heretofore known. In fact, the resistance to hydrolysis of articles molded from compositions of the invention is so superior that such articles show better retention of electrical properties upon exposure to high humidity than articles molded from compositions known prior to this invention.

The results in Table 1 also indicate the advantages obtained with the molding compositions of the present invention, particularly in the retention of insulation resistance upon exposure to high humidity conditions, which is a very important electrical property of alkyd molding compositions and which has been, in the alkyd molding compositions heretofore known, the property requiring the most improvement. As the results in Table 1 indicate, the use of 20% or 25% diallyl phthalate in the present compositions imparts an even greater improvement in insulation resistance than the use of 15%.

EXAMPLE II (a) A polymerizable unsaturated alkyd (83.25 grams, prepared by esterifying 0.8 mol of ethylene glycol and 0.2 mol of propylene glycol with 0.9 mol of maleic anhydride and 0.1 mol of a mixture of dichlorophthalic anhydrides in the presence of an amount of hydroquinone equal to 0.06% of the charge by the procedure hereinbefore described to an acid number of about 22.5 and a viscosity of 4.6 poises) is mixed in a Banbury mixer with diallyl phthalate (11.35 grams), a catalyst (3.74 grams of "Luperco ATC"), anthophyllite fibers (115 grams), kaolin (115 grams), zinc oxide (32.4 grams) and a lubricant (7.2 grams of zinc stearate). The mixing is continued until a soft, homogeneous dough is obtained. The material is then passed through warm rubber rolls to form sheets of a thickness of approximately ⅛ inch. The sheets are allowed to solidify fully while at a temperature below 90° F. and are then granulated in a high speed cutter to a maximum particle diameter of about ⅛ inch.

(b) The procedure described in (a) is repeated except that in the preparation of the polymerizable unsaturated alkyd the proportion of maleic anhydride is 0.8 mol and the proportion of the mixture of dichlorophthalic anhydrides is 0.2 mol, producing an alkyd having an acid number of 18.7 and a viscosity of 2.45 poises.

(c) The procedure described in (a) is repeated except that in the preparation of the polymerizable unsaturated alkyd the proportion of maleic anhydride is 0.6 mol and the proportion of the mixture of dichlorophthalic anhydrides is 0.4 mol, producing an alkyd having an acid number of 22.9 and a viscosity of 1.06 poises.

(d) The procedure described in (a) is repeated except that tetrachlorophthalic anhydride (0.1 mol) is used in place of the mixture of dichlorophthalic anhydrides in the preparation of the alkyd, producing an alkyd having an acid number of 17.6 and a viscosity of 5.0 poises.

(e) The procedure described in (c) is repeated except that tetrachlorophthalic anhydride (0.4 mol) is used in place of the mixture of dichlorophthalic anhydrides in the preparation of the alkyd which had an acid number of 18.8 and a viscosity of 1.55 poises.

Samples of the compositions prepared as described in (a), (b), (c), (d) and (e) above (the compositions being designated hereinafter as a, b, c, d and e, respectively) are molded for one minute under one to four tons of pressure per square inch of projected area in a mold heated with steam at 75 pounds gauge pressure to produce small disks, the results being tabulated below.

COMPOSITION

|  | a | b | c | d | e |
|---|---|---|---|---|---|
| Boiling water, abs. 1 hr | .060 | .039 | .030 | .045 | .015 |
| Cold water, abs. 24 hrs | .021 | .012 | .011 | .014 | .012 |
| Cold water, abs. 48 hrs | .029 | .021 | .015 | .027 | .016 |
| Cold water, abs. 7 days | .055 | .042 | .032 | .054 | .042 |
| Barcol Hardness (original) | 61 | 59 | 55 | 60 | 50 |
| Barcol Hardness after boiling | 45 | 46 | 49 | 51 | 42 |
| Dielectric constant (60 cycles) | 5.76 | 6.00 | 5.94 | 5.50 | 5.38 |
| Power factor (60 cycles) | 4.2 | 5.0 | 3.9 | 3.5 | 3.5 |
| Dielectric constant (10⁶ cycles) | 4.97 | 4.87 | 5.05 | 4.91 | 4.84 |
| Power factor (10⁶ cycles) | 1.47 | 1.46 | 1.13 | 1.45 | 1.02 |
| Arc resistance | 185 | 185 | 182 | 185 | 182 |
| Insulation Resistance (meg.): |  |  |  |  |  |
| 1 day |  | 1,400 |  |  |  |
| 2 days | 38 | 1,200 | 1,200 |  |  |
| 4 days |  |  |  | 4.8 | 360 |
| 5 days | 2.1 |  | 1,800 |  |  |
| 6 days |  | 15 |  |  |  |
| 7 days | 1.0 |  | 1,400 |  |  |
| 8 days |  |  |  | .55 | 36 |
| 9 days |  | 2.5 |  |  |  |
| 11 days | .2 |  | 230 |  |  |
| 15 days |  |  |  | .1 | 2.8 |

EXAMPLE III (a) The procedure described in Example II(a) is repeated except that the polymerizable unsaturated alkyd is prepared by esterifying 0.85 mol of ethylene glycol and 0.2 mol of propylene glycol with 0.8 mol of maleic anhydride, 0.05 mol of the mixture of dichlorophthalic anhydrides and 0.15 mol of phthalic anhydride by the procedure described, producing an alkyd having an acid number of 23.0 and a viscosity of 1.75 poises.

(b) The procedure described in Example III(a) is repeated except that the polymerizable unsaturated alkyd is prepared by esterifying 0.85 mol of ethylene glycol and 0.2 mol of propylene glycol with 0.8 mol of maleic anhydride, 0.1 mol of the mixture of dichlorophthalic anhydrides and 0.1 mol of phthalic anhydride, producing an alkyd having an acid number of 18.9 and a viscosity of 3.80 poises.

(c) The procedure described in Example II(a) is repeated except that the polymerizable unsaturated alkyd is prepared by esterifying 0.85 mol of ethylene glycol and 0.2 mol of propylene glycol with 0.8 mol of maleic anhydride, 0.05 mol of phthalic anhydride and 0.15 mol of the mixture of dichlorophthalic anhydrides, producing an alkyd having an acid number of 18.3 and a viscosity of 4.10 poises.

(d) The procedure described in (a) above is repeated except that tetrachlorophthalic anhydride is used in place of the mixture of dichlorophthalic anhydrides, producing an alkyd having an acid number of 21.3 and a viscosity of 2.70 poises.

(e) The procedure described in (b) above is repeated except that tetrachlorophthalic anhydride is used in place of the mixture of dichlorophthalic anhydrides, producing an alkyd having an acid number of 20.0 and a viscosity of 3.20 poises.

Samples of the compositions prepared as described in (a) through (e) above (the compositions being designated hereinafter as a, b, c, d, and e) are molded and tested by the procedures hereinbefore described, the results being tabulated below.

COMPOSITION

|  | a | b | c | d | e |
|---|---|---|---|---|---|
| Boiling water, abs. 1 hr | .069 | .056 | .052 | .064 | .045 |
| Cold water, abs. 24 hrs |  |  |  | .022 | .018 |
| Cold water, abs. 48 hrs | .027 | .024 | .024 | .026 | .025 |
| Cold water, abs. 7 days | .059 | .052 | .051 | .060 | .053 |
| Barcol Hardness (original) | 62 | 62 | 61 | 64 | 63 |
| Barcol Hardness after boiling | 44 | 48 | 48 | 48 | 50 |
| Arc Resistance | 184 | 183 | 184 | 184 | 185 |
| Dielectric constant (60 cycles) | 5.64 | 5.52 | 5.45 | 5.46 | 5.45 |
| Power factor (60 cycles) | 5.0 | 4.6 | 4.5 | 4.3 | 4.2 |
| Dielectric constant (10⁶ cycles) | 4.42 | 4.30 | 4.35 | 4.38 | 4.39 |
| Power factor (10⁶ cycles) | 1.73 | 1.66 | 1.62 | 1.68 | 1.60 |
| Insulation Resistance: |  |  |  |  |  |
| 3 days | 45 | 240 | 59 | 83 | 370 |
| 5 days | 7.7 | 24 | 8.3 | 13 | 48 |
| 10 days | .7 | 1.7 | 1.0 | 1.4 | 4.0 |

EXAMPLE IV (a) A polymerizable binder consisting of a polymerizable unsaturated alkyd (184 grams prepared by esterifying 0.6 mol of ethylene glycol, 0.2 mol of propylene glycol and 0.2 mol of pentanediol-2,4 with 0.8 mol of maleic anhydride and 0.2 mol of tetrachlorophthalic anhydride by the procedure hereinbefore described to an acid number of 26 and a viscosity of 2.0 poises) and 32.4 grams of diallyl phthalate is mixed in a Banbury mixer with "Luperco ATC" catalyst (8.6 grams), resin-coated kaolin particles (237 grams), anthophyllite fibers (237 grams), barium carbonate (40 grams) and zinc stearate (16 grams). The resin-coated kaolin particles are prepared as follows: a reaction mixture of a heterocyclic polyamine (109 grams of melamine), formalin (210 grams) and water (400 grams) is heated to a temperature of 80° C. As soon as a clear solution is obtained, the pH is adjusted to 6.7 by adding lactic acid (0.7 cc. of a 10% solution), and the heating is continued for a total time of 10 minutes. The resin solution is then cooled to 60° C. and diluted with water (400 grams). The resulting resin solution is then absorbed on kaolin (1816 grams) in a Hobart mixer to obtain a doughy mass which is then dried on trays at 160° F. for 4 hours. The resulting material is then ground into chunks ½ inch or less in cross section, and the coarse product is then dried at 300° F. for 2 hours before grinding it in a mill of the rotary knife cutter type, screening the resulting particles through a 35 mesh screen, and then ball milling the screened fines to obtain finely pulverized resin-coated kaolin. The mixing is continued until a soft, homogeneous dough is obtained. The material is then passed through warm rubber rolls to form sheets of a thickness of approximately ⅛ inch. The sheets are allowed to solidify fully while at a temperature below 90° F. and are then granulated in a high speed cutter to a maximum particle diameter of about ⅛ inch.

(b) The procedure described in (a) is repeated except that the polymerizable unsaturated alkyd is prepared by esterifying 0.8 mol of ethylene glycol and 0.2 mol of dipropylene glycol with 0.8 mol of maleic anhydride and 0.2 mol of tetrachlorophthalic anhydride by the procedure described to an acid number of 15.7 and a viscosity of 3.75 poises.

(c) The procedure described in (a) is repeated except that the polymerizable unsaturated alkyd is prepared by esterifying 0.8 mol of ethylene glycol and 0.2 mol of 2- ethylhexanediol-2,3 with 0.8 mol of maleic anhydride and 0.2 mol of tetrachlorophthalic anhydride by the procedure described to an acid number of 13.3 and a viscosity of 1.85 poises.

Articles molded from the compositions described in (a), (b) and (c) above have excellent water resistance and insulation resistance.

This application is a continuation-in-part of my copending application Serial No. 243,597 filed August 24, 1951, now abandoned.

What is claimed is:

1. A molding composition comprising from 50% to 85% by weight based on the total weight of the composition of filler and from 15% to 50% by weight of a mixture of the following constituents (a) 9 parts of an amorphous polymerizable unsaturated alkyd, solid at atmospheric temperatures, having a viscosity of from 0.9 to 5.0 poises as a 50% solution in methyl cellosolve, an acid number of from 10 to 35 and in which from 4% to 40% of the polycarboxylic acid radicals are chloro-substituted phthalic acid radicals and from 60% to 96% of such radicals are dicarboxy alkene radicals, the dicarboxy alkene having from 4 to 5 carbon atoms and having the carboxy radicals attached to adjacent carbon atoms, said alkyd being produced by the reaction of a polyhydric alcohol and the chloro-substituted phthalic acid and dicarboxy alkene employing at least an equimolar amount of said alcohol relative to the polycarboxylic acids, but not more than an excess of about 10% by weight of said alcohol based on the stoichiometric amount of said alcohol required, and (b) at least 1 part of diallyl phthalate, the maximum weight of said diallyl phthalate present being not more than $$10+n+\frac{X}{\sqrt{n}}\%$$

of the total weight of (a) and (b), $n$ being the average number of chlorine atoms per chloro-substituted phthalic acid radical in the unsaturated alkyd and X being the chlorine content of such radicals expressed as percent by weight of the unsaturated alkyd, and (c) an organic peroxide polymerization catalyst, the said diallyl phthalate being mixed with the filler and unsaturated polymerizable alkyd under conditions such that substantially no reaction takes place therebetween and substantially no polymerization of the alkyd takes place.

2. A molding composition as claimed in claim 1, which comprises 2% to 20% of a base of a metal of group II of the periodic system.

3. A molding composition as claimed in claim 1, which contains from 10% to 30% of diallyl phthalate based on the combined weights of said alkyd resin and diallyl phthalate.

4. A molding composition as claimed in claim 1, in which the chloro-substituted phthalic acid is monochlorophthalic acid and the molding composition contains from 10% to 19% diallyl phthalate.

5. A molding composition as claimed in claim 1, in which the chloro-substituted phthalic acid is dichlorophthalic acid and the molding composition contains from 10% to 22.5% diallyl phthalate.

6. A molding composition as claimed in claim 1, in which the chloro-substituted phthalic acid is tetrachlorophthalic acid and the molding composition contains from 10% to 30% diallyl phthalate.

7. A non-tacky granular filled molding composition comprising from 50% to 85% based on the total weight of the composition, of filler, from 15% to 50% based on the total weight of the composition of a mixture of the following constituents homogeneously admixed with the filler (a) 9 parts of an amorphous polymerizable unsaturated alkyd, solid at atmospheric temperature, having a viscosity of from 0.95 to 3.15 poises as a 50% solution in methyl cellosolve and an acid number of from 15 to 27 in which from 4% to 40% of polycarboxylic acid radicals are chloro-substituted phthalic acid radicals and from 60% to 96% of such radicals are dicarboxy alkene radicals, the dicarboxy alkene having from 4 to 5 carbon atoms and having the carboxy radicals attached to adjacent carbon atoms, said alkyd being produced by the reaction of a polyhydric alcohol and the chloro-substituted phthalic acid and dicarboxy alkene employing at least an equimolar amount of said alcohol relative to the polycarboxylic acids, but not more than an excess of about 10% by weight of said alcohol based on the stoichiometric amount of said alcohol required, (b) more than 1 part of diallyl phthalate, the maximum weight of said diallyl phthalate being not more than $$10+n+\frac{X}{\sqrt{n}}\%$$

of the total weight of (a) and (b), $n$ being the average number of chlorine atoms per chloro-substituted phthalic acid radical in the unsaturated alkyd and X being the chlorine content of such radicals expressed as percent by weight of the unsaturated alkyd, and (c) an organic peroxide polymerization catalyst, the said unsaturated alkyd, diallyl phthalate, organic peroxide polymerization catalyst and filler being mixed under conditions such that substantially uniform distribution of the filler, catalyst and diallyl phthalate in said alkyd takes place and substantially no reaction takes place between the said diallyl phthalate and the said alkyd and substantially no polymerization of the alkyd takes place during said mixing.

8. A non-tacky granular filled molding composition as claimed in claim 7, in which the chloro-substituted phthalic acid is monochlorophthalic acid and the molding composition contains from 10% to 19% diallyl phthalate.

9. A non-tacky granular filled molding composition as claimed in claim 7, in which the chloro-substituted phthalic acid is dichlorophthalic acid and the molding composition contains from 10% to 22.5% diallyl phthalate.

10. A non-tacky granular filled molding composition as claimed in claim 7, in which the chloro-substituted phthalic acid is tetrachlorophthalic acid and the molding composition contains from 10% to 30% diallyl phthalate.

11. A non-tacky granular filled molding composition as claimed in claim 7, in which from 15% to 30% of the polycarboxylic acid radicals are chloro-substituted phthalic acid radicals, from 70% to 85% of such radicals are dicarboxy alkene radicals, and the filler is an inorganic filler.

References Cited in the file of this patent

UNITED STATES PATENTS

| | | |
|---|---|---|
| 2,529,512 | Ott | Nov. 14, 1950 |
| 2,537,520 | Eger | Jan. 9, 1951 |
| 2,570,269 | Parker | Oct. 9, 1951 |
| 2,584,315 | Agnew | Feb. 5, 1952 |
| 2,680,104 | Cordier | June 1, 1954 |
| 2,680,105 | Baker | June 1, 1954 |